United States Patent [19]

Hille

[11] Patent Number: 4,747,802
[45] Date of Patent: May 31, 1988

[54] RESILIENT LINK SHAFT COUPLING

[75] Inventor: Friedrich Hille, Schwerte, Fed. Rep. of Germany

[73] Assignee: Firma Heinrich Desch KG, Arnsberg, Fed. Rep. of Germany

[21] Appl. No.: 932,743

[22] Filed: Nov. 19, 1986

[30] Foreign Application Priority Data

May 24, 1986 [DE] Fed. Rep. of Germany ....... 3617578

[51] Int. Cl.⁴ .......................... F16D 3/62; F16D 3/79
[52] U.S. Cl. ....................................... 464/69; 464/99
[58] Field of Search ..................... 464/69, 98, 99, 147, 464/153, 160

[56] References Cited

U.S. PATENT DOCUMENTS

| | | | |
|---|---|---|---|
| 1,893,593 | 1/1933 | Oechsle | 464/69 |
| 3,654,775 | 4/1972 | Williams | 464/99 X |
| 3,726,108 | 4/1973 | Geislinger | 464/69 X |
| 4,019,345 | 4/1977 | Fukuda | 464/69 |
| 4,019,346 | 4/1977 | Fukuda | 464/69 X |
| 4,460,345 | 7/1984 | Chivari | 464/69 |

FOREIGN PATENT DOCUMENTS

| | | | |
|---|---|---|---|
| 2100052 | 7/1972 | Fed. Rep. of Germany | 464/69 |
| 320054 | 4/1957 | Switzerland | 464/69 |
| 2065828 | 7/1981 | United Kingdom | 464/99 |

OTHER PUBLICATIONS

Article, A. Schalitz, "Kupplungs-Atlas", 4th ed., (1975), p. 30.

Primary Examiner—Daniel P. Stodola
Attorney, Agent, or Firm—Sprung Horn Kramer & Woods

[57] ABSTRACT

A coupling comprising two hubs (1) elastically joined to a hollow shaft (2), which surrounds the hubs, by six elastically resilient links (3) which are bolted alternatingly in an hexagonal pattern to a hub flange (10) and a shaft flange (20) at the ends of the coupling. This permits parallel and angular misalignments according to the cardanic principle while torque is being transmitted. Because the flanges lie in the same transverse plane, the coupling is protected against slipping in the event that the resilient link elements should fail. Because the links are externally mounted, they permit optimum cardanic motion. The hubs may be fitted inside the hollow shaft (short configuration) or they may bolted on so as to project beyond the ends of the hollow shaft (long configuration).

3 Claims, 3 Drawing Sheets

RESILIENT LINK SHAFT COUPLING

BACKGROUND OF THE INVENTION

1. Field of the Invention

The present invention relates to an elastic shaft coupling of the type comprising two identical hubs and a hollow shaft.

2. Description of the Related Art

On the basis of the cardanic principle, elastic shaft couplings of this type, which are fitted with elastic ring elements (resilient links), permit relatively large parallel and angular misalignments as well as axial displacements while transmitting torque. The hollow shaft can be made of one piece or, for reasons of assembly, it can be made up of separate parts. In particular, the same parts—i.e. the two hubs and the hollow shaft—can be combined with one another in various ways. The two hubs may be located inside the hollow shaft in order to achieve the shortest possible overall length; alternatively, one or both hubs can be fitted in such a way that they project beyond the end or ends of the hollow shaft, thus increasing the overall length of the coupling. In both cases the cardanic principle is retained.

In a known elastic coupling of the above-mentioned type (Thomas coupling, Type AM, as shown in FIG. 2.8-34 on p. 30 of the "Kupplungs-Atlas" [Handbook of Couplings], 4th edition, by August Schalitz), there is no danger of slip occurring should one of the elastic ring elements fracture because the ring element is located in a gap between the hub flanges and the flanges of the hollow shaft, which are arranged alongside each other. In addition, an elastic coupling is known from German "Auslegeschrift" DE-AS No. 21 00 05, which incorporates elastic links between two hubs and has an antislip mechanism consisting of spherical roller bearings which engage in cylindrical boreholes. However, in this known coupling the above-mentioned possibility of combining the hubs and shafts to vary the overall length does not exist.

SUMMARY OF THE INVENTION

The purpose of the present invention is to design a non-slip elastic coupling of the aforementioned type while retaining the various possible ways of combining the different component parts to vary the overall length of the coupling.

This task is accomplished by a coupling according to the present invention having an elastic shaft coupling having two identical hubs and a hollow shaft adapted to receive cylindrical parts of said identical hubs with predetermined play, wherein at each end each of the two hubs is linked to the hollow shaft by means of a resilient ring element bolted alternatingly to a flange of the hub and a flange of the hollow shaft with screws parallel to the axis of said couplings, CHARACTERIZED IN THAT hub flanges and hollow shaft flanges lie in the same transverse plane, whereby the hub flanges fit into recesses in the hollow shaft, which is somewhat longer than twice a hub length, and the elastic ring element bolted frontally to the coupling.

In this coupling, the anti-slip protection is provided by arranging the flanges in the same transverse plane at each end of the shaft so that in the event of the elastic elements failing, a positive-drive connection becomes effective between the flanges and the torque continues to be transmitted as in a dog clutch. In such a coupling the elastic ring elements rest against the end face surfaces, i.e. largely to the exterior of the coupling. This has the additional advantage of permitting maximum axial spacing between the resilient ring elements and thus maximum displacement according to the cardanic principle.

In the preferred variant of the coupling according to the invention, the respective elastic ring elements are designed as polygons consisting of straight resilient links; this makes it possible to replace the links by a known method without having to separate the shafts from each other.

According to a further preferred further variant of the invention the flanges are fitted with radial stops at the transition to the cylindrical part of the coupling; this is to facilitate positive engagement of the flanges in the event of failure of the resilient elements.

The hub flanges have contact surfaces on both sides to accept the links so that it is also possible to bolt the hubs on in such a manner that they project beyond the hollow shaft. In this case the links are located on the outside of the hub flanges or shaft flanges thus again offering not only the advantage of maximum cardanic spacing but also preventing slippage of the coupling.

Furthermore, all parts of the coupling, whether it be the two hubs, the hollow shaft or the link straps, are simple to manufacture and are relatively lightweight.

Because the links are located on the end faces they are easier to replace than when they are interposedly arranged.

It is intended to strengthen the coupling to transmit particularly high torque forces, then in accordance with a further feature of the invention it is possible to fit double, resilient ring elements in the form of links at each end because the hub flanges and also the shaft flanges have contact surfaces for such links on both sides of the flanges.

If, as is allowed for in the preferred embodiment of the invention, the recesses between the hollow shaft flanges are larger in an axial direction than the corresponding dimension of the flange, this permits the hollow shaft to be shifted axially, after the joining bolts have been removed, to such an extent that a projectingly mounted hub can be radially removed.

The resilient ring elements can furthermore each have the form of a closed ring or they may take the form of any desired polygon made up of links, as well as the form of a square, triangle, hexagon, etc.

BRIEF DESCRIPTION OF THE DRAWINGS

The preferred embodiment of the invention will now be described in detail in conjunction with the attached drawings in which.

DETAILED DESCRIPTION OF THE PREFERRED EMBODIMENT

Figure 1:
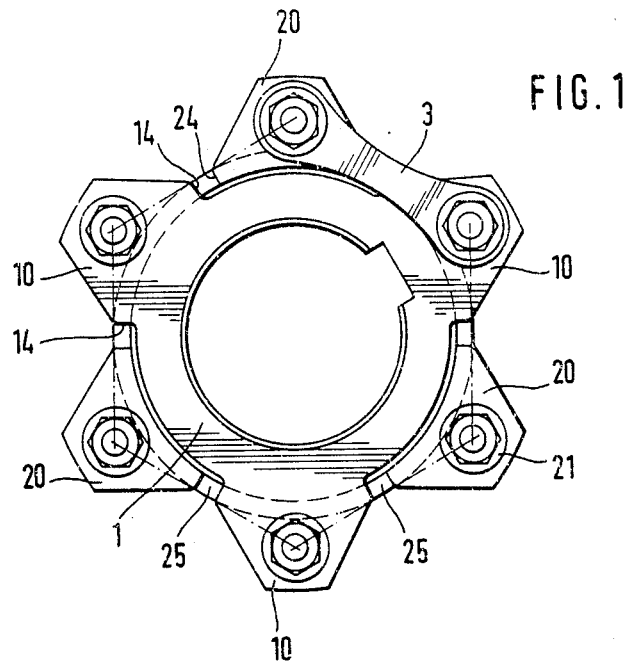
FIG. 1 is a view of a shaft coupling according to the invention, seen in an axial direction (without the links)
Figure 2:
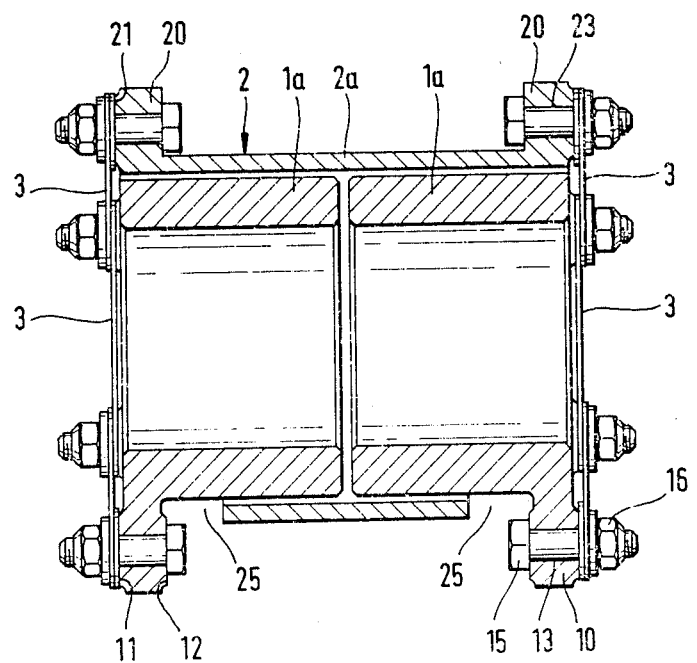
FIG. 2 is a longitudinal section through II—II in FIG. 1.

Referring to FIGS. 1 and 2, the coupling consists of two identical hubs 1, each of which is designed to accept a shaft; also of a shaft 2, which is slightly longer than the combined length of the two hubs, and whose inner diameter is slightly larger than the outer diameter of the hubs. Other parts of the coupling consist of twelve resilient links 3, six of which in each case form a resilient ring element in the form of a hexagon. Finally, the coupling comprises a corresponding number of joining bolts 15 with the appropriate nuts 16, which are used to join the resilient links 3 together with the hubs 1 or the hollow shaft 2.

Each hub 1 has a cylindrical part 1a and three flanges 10 symmetrically arranged at angular spacings of 120° at each end face. Each flange 10 has a front contact surface 11, a rear contact surface 12, an axially parallel borehole 13 and a radial stop 14.

The hollow shaft 2 also has a cylindrical portion 2a and three flanges 20 on each end face, said flanges also being arranged at 120° intervals. A plane surface 21 is formed at the front face of each shaft flange. Similarly, each flange is provided with a borehole 23. Recesses 25 are formed between the flanges 20.

Flanges 10 and 20 all have the same profile, namely trapezoidal. A radial stop 24 is formed on each flange where the latter merges into the cylindrical portion of the coupling.

The coupling as illustrated in FIGS. 1 and 2 is designed in such a way that the cylindrical parts 1a of the two hubs can be accepted by the cylindrical part 2a of the hollow shaft; flanges 10 and 20 lie in the same transverse plane, i.e. the flanges 10 of the hubs each fit in to the recesses 25 on the hollow shaft. Thus, there is a total of six alternating hub and shaft flanges arranged at the face end of each coupling, thereby forming a common end face plane 11/21.

At each end face six resilient links 3 are provided to join hub 1 and hollow shaft 20; these links are in contact with the plane surfaces 11, 21 and one end is bolted to a hub flange 10 while the other is bolted to a hollow shaft flange 20, in each case by means of a joining bolt 15 and the associated nut 16.

The elastic coupling is torsionally rigid, but because of the elastic links it permits relatively large parallel and angular misalignments as well as axial displacements, in accordance with the cardanic principle. For reasons of assembly the hollow shaft 2 may be designed in more than one piece. Instead of a hexagon consisting of resilient links, a continuous elastic element, e.g. a circular ring, may be employed.

Because the hub flanges and the shaft flanges are arranged in the same transverse plane at each end face of the coupling, torque can be transmitted even if the elastic elements fail, because the stops 24 at the flanges come into action and the coupling acts like a dog clutch. The coupling thus cannot slip.

Figure 3:
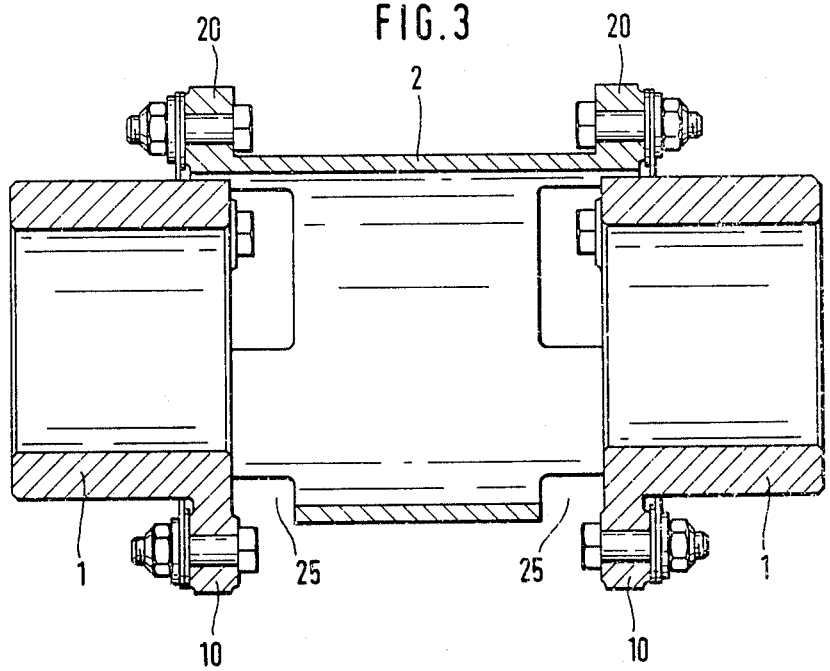
FIG. 3 shows in principle the same coupling, but here doubled in length using the components illustrated in FIGS. 1 and 2.

The same parts that are illustrated in FIGS. 1 and 2 can also be fitted together in the manner shown in FIG. 3, with the cylindrical parts 1a of the hubs projecting in each case axially beyond the hollow shaft 2, so that the coupling is longer in the axial direction and the spacing between the shafts to be coupled is larger. In the configuration according to FIG. 3 the links 3 are again bolted to the face ends of the flanges, although in the case of the hub flanges the links are in contact with the respective rear surfaces 12. The parts of the coupling can also be combined in such a way that only one hub projects beyond the hollow shaft while the other one fits inside the shaft so that the axial spacing is correspondingly smaller than that shown in FIG. 3.

Finally, the parts of the coupling can also be assembled in such a way that the overall length of the coupling is greater than that shown in FIG. 3. This is done by arranging the hub flanges alongside the shaft flanges with the links in between so that the axial spacing of the hubs is even larger, although in this case the non-slip property of the coupling is lost.

Figure 4:
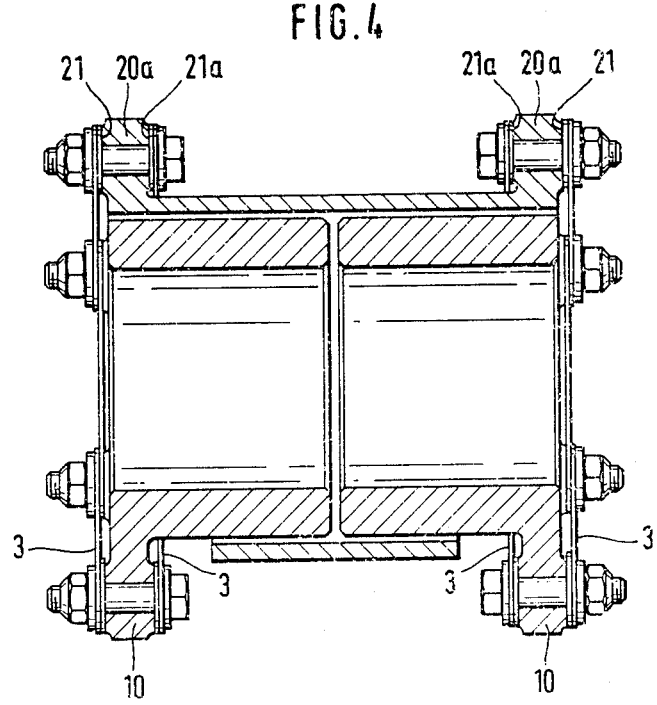
FIG. 4 is a longitudinal section, like FIG. 2, but in this case there are double ring elements at each end.

In the coupling as shown in FIG. 4, the flanges are joined at each end by double ring elements consisting of link pieces. In this case the rear links are in contact with the rear surfaces 12 and 21a of the flanges.

Figure 5:
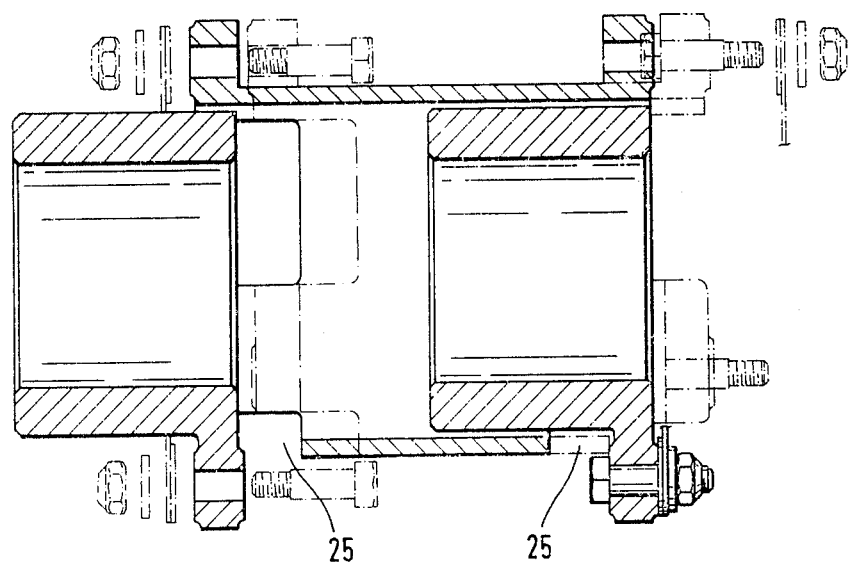
FIG. 5 is a longitudinal section through a coupling, elongated at one end only, with an exploded view of the joining elements.

In the form of the coupling shown in FIG. 5, the cylindrical part 1a of a hub projects only at one end of the hollow shaft 2, while at the other end of the shaft the cylindrical part of the hub fits inside the shaft. This coupling is thus just lengthened at one end. Because the recesses 25 in the cylindrical part of the hollow shaft 2 are slightly larger when measured in the axial direction than the corresponding dimensions of the flanges, it is possible, after detaching the joining bolts, to displace the hollow shaft 2 axially to the extent indicated by the dotted line so that the projecting hub can be removed in a radial direction.

What is claimed is:

1. An elastic shaft coupling consisting essentially of two identical flanged hubs and a flanged hollow shaft adapted to receive cylindrical parts of said identical hubs with predetermined play, one end of each of the two hubs being linked to the hollow shaft by means of a respective resilient ring element bolted alternatingly to the flange of the hub and the flange of the hollow shaft with bolts parallel to the axis of said shaft, the ring elements comprising individual polygonally arranged resilient links, the flanges having radial stops formed thereon, the hub flanges and hollow shaft flanges projecting radially outwardly in the same transverse plane radially outside the hollow shaft, the hollow shaft being provided with axially extending recesses through which the hub flanges extend, the recesses having axial lengths greater than the axial lengths of the flanges, the hollow shaft being more than twice a hub length, and the elastic ring element bolts being bolted frontally to the coupling.

2. An elastic shaft coupling according to claim 1, wherein the hub flanges have planar front and rear surfaces.

3. An elastic shaft coupling according to claim 1, wherein the shaft flanges have planar front and rear surfaces.

* * * * *